United States Patent
Qian et al.

(10) Patent No.: US 9,628,988 B2
(45) Date of Patent: Apr. 18, 2017

(54) METHOD AND DEVICE OF TRANS-BROWSER LOGIN FOR MOBILE TERMINAL

(71) Applicant: HUIZHOU TCL MOBILE COMMUNICATION CO., LTD., Huizhou (CN)

(72) Inventors: Wen Qian, Huizhou (CN); Hongwei Qian, Huizhou (CN)

(73) Assignee: HUIZHOU TCL MOBILE COMMUNICATION CO., LTD., Huizhou (CN)

( * ) Notice: Subject to any disclaimer, the term of this patent is extended or adjusted under 35 U.S.C. 154(b) by 301 days.

(21) Appl. No.: 14/422,588

(22) PCT Filed: Apr. 16, 2014

(86) PCT No.: PCT/CN2014/075454
§ 371 (c)(1),
(2) Date: Feb. 19, 2015

(87) PCT Pub. No.: WO2015/000320
PCT Pub. Date: Jan. 8, 2015

(65) Prior Publication Data
US 2015/0220234 A1    Aug. 6, 2015

(30) Foreign Application Priority Data
Jul. 5, 2013    (CN) .......................... 2013 1 0281386

(51) Int. Cl.
*H04W 12/06*    (2009.01)
*H04L 29/06*    (2006.01)
(Continued)

(52) U.S. Cl.
CPC .......... *H04W 12/06* (2013.01); *G06F 3/0484* (2013.01); *G06F 17/30106* (2013.01);
(Continued)

(58) Field of Classification Search
CPC ...................................................... H04W 12/06
See application file for complete search history.

(56) References Cited

U.S. PATENT DOCUMENTS

| | | | |
|---|---|---|---|
| 7,954,141 B2* | 5/2011 | De Lutiis | .......... H04L 29/12216 706/10 |
| 2002/0037708 A1* | 3/2002 | McCann | ............. H04L 63/0892 455/411 |

(Continued)

FOREIGN PATENT DOCUMENTS

| | | |
|---|---|---|
| CN | 102591916 A | 7/2012 |
| CN | 102821093 A | 12/2012 |
| CN | 102970284 A | 3/2013 |

OTHER PUBLICATIONS

Me et al.; A mobile based approach to strong authentication on Web; Published in: Computing in the Global Information Technology, 2006. ICCGI '06. International Multi-Conference on; Date of Conference: Aug. 1-3, 2006; IEEE Xplore.*

(Continued)

*Primary Examiner* — Bradley Holder
(74) *Attorney, Agent, or Firm* — Shimokaji IP

(57) ABSTRACT

The present disclosure relates to a method and device of trans-browser login for a mobile terminal. The method includes a cookie folder that is created in a memory module of the mobile terminal in advance. A server of a website stores an IMEI number of the mobile terminal under a registration name corresponding to a subscriber. A browser of the mobile terminal receives a website inputted by the subscriber, and searches if a cookie of the website exists in the cookie folder. If the cookie of the website exists in the cookie folder, the cookie is sent to the server of the website, and the server of the website reads the IMEI number of the mobile terminal in the cookie, looks for the corresponding (Continued)

registration name, and returns a webpage to the browser when the registration name is used to log into the website.

19 Claims, 3 Drawing Sheets

(51) Int. Cl.
    *G06F 3/0484*     (2013.01)
    *G06F 17/30*     (2006.01)
    *H04L 29/08*     (2006.01)

(52) U.S. Cl.
    CPC .... *G06F 17/30899* (2013.01); *H04L 63/0876* (2013.01); *H04L 67/02* (2013.01); *H04L 67/146* (2013.01); *H04L 63/0815* (2013.01)

(56) References Cited

U.S. PATENT DOCUMENTS

| | | | | |
|---|---|---|---|---|
| 2002/0152178 | A1* | 10/2002 | Lee | G06Q 20/04 705/67 |
| 2008/0127320 | A1* | 5/2008 | De Lutiis | H04L 29/12216 726/9 |
| 2008/0301785 | A1* | 12/2008 | Beyer | H04L 63/08 726/5 |
| 2010/0299745 | A1* | 11/2010 | Karppinen | G06Q 20/3552 726/18 |
| 2011/0067095 | A1* | 3/2011 | Leicher | H04L 63/06 726/10 |
| 2011/0265173 | A1* | 10/2011 | Naaman | G06F 21/41 726/8 |
| 2013/0308778 | A1* | 11/2013 | Fosmark | H04L 63/0823 380/270 |
| 2013/0311768 | A1* | 11/2013 | Fosmark | G06Q 20/3223 713/155 |

OTHER PUBLICATIONS

Sharp et al.; Enhancing web browsing security on public terminals using mobile composition; Published in: Proceeding MobiSys '08 Proceedings of the 6th international conference on Mobile systems, applications, and services; 2008; pp. 94-105; ACM Digital Library.*

* cited by examiner

METHOD AND DEVICE OF TRANS-BROWSER LOGIN FOR MOBILE TERMINAL

TECHNICAL FIELD

The present disclosure generally relates to mobile terminal devices. In particular, the present disclosure relates to a method and device of trans-browser login for a mobile terminal.

BACKGROUND

Along with extensive use of mobile terminals, in particular 3G smart phones, mobile Internet has been rapidly developed. Functions originally used by subscribers on computers have been gradually transferred to cell phones. In particular, online "surfing" functions of computers have been transferred to cell phones. As an entry to mobile terminal based Internet usage, mobile browsers now have increasingly powerful functions, such as high-speed online performance and powerful cores. However, at least one problem, associated with mobile terminal based Internet usage, has not been solved, i.e. the issue of trans-browser login on cell phones. It is well known that, when a subscriber logs in a website, all browsers have a "cookie" to record the information such as a subscriber's ID, password, browsed webpages, and time spent viewing any given webpage. When the subscriber visits a website second time, a website server learns relevant information by reading a cookie, the server can perform corresponding actions, and the subscriber can log into the server, directly, without typing in an ID or password. However, each browser records the cookie according to rules associated with the given browser. When a subscriber's cell phone has multiple browsers, a subscriber name and password need to be typed in each time a different browser is used to visit a given website. The lack of universality in recorded cookies has resulted in great inconvenience to subscribers.

Therefore, the prior art needs to be improved and developed.

SUMMARY

The technical problems that the present invention intends to solve are to provide a method and device of trans-browser login for a mobile terminal. The methods and devices are intended to solve the problems that currently exist when a mobile terminal logs into a same website by switching browsers, wherein a subscriber name and password must be typed in again.

The present invention employs the following technical solution:

A method of trans-browser login for a mobile terminal includes creating a cookie folder in a memory module of the mobile terminal generating a cookie by correlating addresses of different websites with a registration name and password of a subscriber corresponding to the different websites and an IMEI number of the mobile terminal; storing the cookie in a cookie folder; sending the cookie to a server of a website, wherein the server of the website stores the IMEI number of the mobile terminal under the registration name corresponding to the subscriber; receiving, at any browser of the mobile terminal, a website inputted by the subscriber; searching if a cookie of the website, inputted by the subscriber, exists in the cookie folder; and if a cookie of the website, inputted by the subscriber, exists in the cookie folder: sending the cookie to the server of the website; reading, by the server of the website, the IMEI number of the mobile terminal in the cookie; searching for the registration name according to the IMEI number of the mobile terminal; and returning, to the browser, a webpage when the registration name is used to log in the website; if a cookie of the website, inputted by the subscriber, does not exist in the cookie folder generating a cookie by correlating addresses of different websites with a registration name and password of a subscriber corresponding to the different websites and an IMEI number of the mobile terminal.

In another embodiment, a method of trans-browser login for a mobile terminal includes verifying, using a server of the website, a cookie, if the verification of the cookie fails, inputting a registration name and a password; and if the verification of the cookie succeeds, returning, to a browser, a webpage, when the registration name is used to log into a website.

In a further embodiment, a method of trans-browser login for a mobile terminal, wherein during verification, the server of the website verifies if the subscriber name corresponds to the password or if it has expired.

In yet another embodiment, a method of trans-browser login for a mobile terminal includes correlating addresses of different websites to a IMSI number of a mobile subscriber and generating a corresponding cookie, and storing the cookie in a cookie folder.

In yet a further embodiment, a method of trans-browser login for a mobile terminal includes reading an IMSI number of a mobile subscriber under a registration name corresponding to the subscriber.

In another embodiment, a method of trans-browser login for a mobile terminal includes reading an IMSI number of a mobile subscriber in a cookie, searching for a corresponding registration name according to an IMEI number of the mobile terminal and the IMSI number of the mobile subscriber, and returning, to a browser, a webpage when the registration name is used to log into a website.

In a further embodiment, a method of trans-browser login for a mobile terminal includes creating a cookie folder in a memory module of the mobile terminal generating a cookie by correlating addresses of different websites with a registration name and password of a subscriber corresponding to the different websites and an IMEI number of the mobile terminal; storing the cookie in a cookie folder; correlating addresses of the different websites with a valid time of the subscriber on said different websites and generating a corresponding cookie, and storing the cookie in the cookie folder; sending the cookie to a server of a website, wherein the server of the website stores the IMEI number of the mobile terminal under the registration name corresponding to the subscriber; receiving, at any browser of the mobile terminal, a website inputted by the subscriber; searching if a cookie of the website, inputted by the subscriber, exists in the cookie folder; and if a cookie of the website, inputted by the subscriber, exists in the cookie folder: sending the cookie to the server of the website; reading, by the server of the website, the IMEI number of the mobile terminal in the cookie; searching for the registration name according to the IMEI number of the mobile terminal; and returning, to the browser, a webpage when the registration name is used to log into the website; if a cookie of the website, inputted by the subscriber, does not exist in the cookie folder, generating a cookie by correlating addresses of different websites with a registration name and password of a subscriber corresponding to the different websites and an IMEI number of the mobile terminal; and correlating addresses of the different websites with the valid time of the subscriber on said different websites and generating a corresponding cookie, and storing the cookie in the cookie folder.

In yet a further embodiment, a device of trans-browser login for a mobile terminal includes a cookie folder generation module for creating a cookie folder in a memory module of the mobile terminal; a cookie correlation and generation module for generating a corresponding cookie by correlating addresses of different websites with a registration name and password of a subscriber corresponding to the websites and an IMEI number of the mobile terminal; a website server module for receiving the cookie and storing the IMEI number of the mobile terminal under the registration name corresponding to the subscriber; a cookie searching module for searching if a cookie of a website, inputted by the subscriber, exists in the cookie folder; a cookie reading module for reading the IMEI number of the mobile terminal in the cookie, searching for the corresponding registration name according to the IMEI number of the mobile terminal, and returning, to the browser, a webpage when the registration name is used to log in the website. The device of trans-browser login for a mobile terminal, wherein said cookie correlation and generation module is further used for correlating to the IMEI number of a mobile subscriber and generating a corresponding cookie.

In another embodiment, a device of trans-browser login for a mobile terminal includes a website server module used for receiving a cookie and storing an IMSI number of a mobile subscriber under a registration name corresponding to the subscriber.

In a further embodiment, a device of trans-browser login for a mobile terminal includes a cookie reading module used for reading an IMSI number, of a mobile subscriber, in a cookie, searching for a corresponding registration name according to a IMEI number of the mobile terminal and the IMSI number of the mobile subscriber, and returning, to a browser, a webpage when the registration name is used to log into a website.

A method and device of trans-browser login for a mobile terminal are provided, which effectively solves the problems associated with, when a website is logged into using one browser, and when the same website is to be logged into using other browsers, a subscriber name and password need to be inputted for each browser. The method creates a cookie folder in a memory module of the mobile terminal, generates a corresponding cookie by correlating addresses of different websites with a subscriber's registration name and password corresponding to the websites, as well as the IMEI number of the mobile terminal, stores the cookie in the cookie folder, sends the cookie to a server of a corresponding website, and stores the IMEI number of the mobile terminal under the registration name corresponding to the subscriber in the server of the website. Subsequently, any browser of the mobile terminal that receives a website, inputted by the subscriber, searches to determine if a cookie of the website exists in the cookie folder. If the cookie exists, the method sends the cookie to the server of the website. If the cookie does not exist, the method generates a corresponding cookie through correlation. A server of the website reads an IMEI number of the mobile terminal in the cookie, searches looks for a corresponding registration name according to the IMEI number of the mobile terminal, and returns, to a browser, a webpage when the registration name is used to log into the website. Thereby, the problem of repeated login among multiple browsers on one mobile terminal is solved. In other words, only one login is needed on the mobile terminal, and as long as the same mobile terminal is used subsequently for login, it is unnecessary to input subscriber name and password again, which results in great convenience for subscribers.

DETAILED DESCRIPTION

A method and device of trans-browser login for a mobile terminal are provided. To make the objects, technical solutions and effects clear, the present invention is described in detail with reference to the accompanying drawings and specific embodiments. It should be understood that the specific embodiments are for illustrative purposes. The specific embodiments are not intended to limit the scope of present invention in any way.

Figure 1:
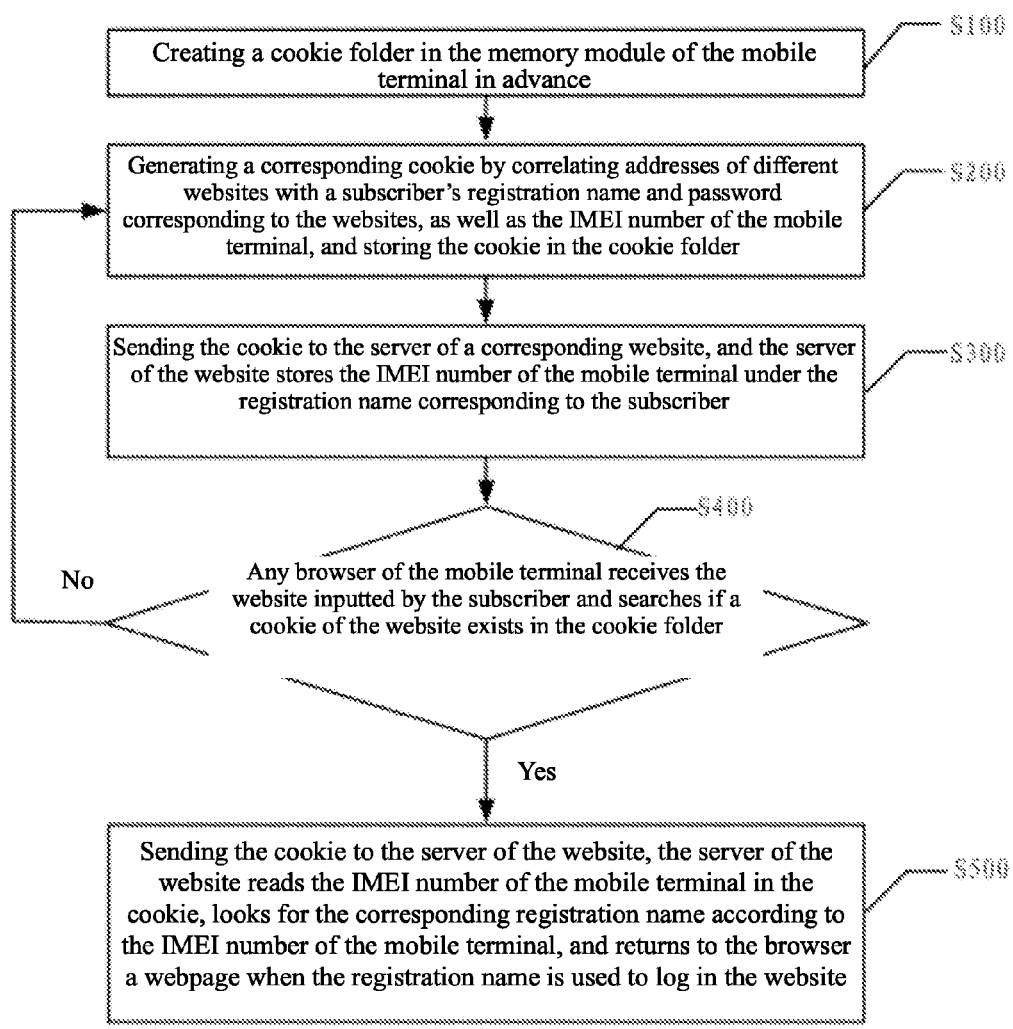
FIG. 1 depicts a flow chart of an exemplary method of trans-browser login for a mobile terminal according to the present invention.

Turning to FIG. 1, a flow chart of a method of trans-browser login for a mobile terminal may include creating a cookie folder in a memory module of the mobile terminal (block S100). The method may also include generating a cookie by correlating addresses of different websites with a registration name and password, of a subscriber, corresponding to the different websites and an IMEI number of the mobile terminal, and storing the cookie in the cookie folder (block S200). The method may further include sending the cookie to a server of a corresponding website, and the server of the website stores the IMEI number of the mobile terminal under the registration name corresponding to the subscriber (block S300). The method may yet further include any browser of the mobile terminal receives a website, inputted by the subscriber, and searches if a cookie of the website exists in the cookie folder (block S400). If the cookie exists, the browser sends the cookie to the server of the website (block S400). The method may also include the server of the website reading the IMEI number of the mobile terminal in the cookie, searching for the corresponding registration name according to the IMEI number of the mobile terminal, and returning, to the browser, a webpage when the registration name is used to log in the website (block S500). If the cookie does not exist in the cookie folder, the method may further include generating a cookie by correlating addresses of different websites with a registration name and password, of a subscriber, corresponding to the different websites and an IMEI number of the mobile terminal, and storing the cookie in the cookie folder (block S200). The mobile terminal may be, for example, a cell phone or tablet. Implementation of the above method is described below in detail with reference to a cell phone as an example.

The term "cookie," as used herein, is in reference to a set of information stored temporarily by a website server on a cell phone, and the website server may use the cookie to identify subscribers. When a subscriber opens up a browser to browse the website, the web server may first send some information, such as a subscriber ID, browsed webpages and time spent, to the cell phone, and a cookie may record text typed by a subscriber, or some selections made by the subscriber, on the website. When the subscriber subsequently opens the same website, the web server may first check if there is cookie information available (e.g., cookie information stored in a cookie folder). If cookie information is available, the website may determine the subscriber according to the content in the cookie and may display corresponding content based on the cookie information. Generally speaking, a cookie may be generated by a server and may be sent to a cell phone browser. A cell phone browser may save the cookie in a text file, for example, under a directory, typically in a manner of distributed key-value storage, and may send the cookie to a server when requesting a website for a second, or subsequent, time. A cookie may include the following three properties. First, when a browser creates a cookie, every request for a website may carry the cookie in a header (e.g., a PHP header, which may be a character string sent out before a server transmits HTML information to a browser in a HTTP protocol). However, the cookie may not be sent for requests for other websites. Moreover, the browser may continue sending the cookie when the websites are opened until the cookie expires. Second, if multiple browsers are installed in one cell phone, each browser may include an independent space to store cookies. As a cookie not only can identify subscribers, but also may contain information of the cell phone and the browser, i.e., one subscriber may obtain different cookie information when using different browsers, or different cell phones, to log into a given website. Third, a cookie may be stored at a client, e.g., a cell phone, which may be divided into a memory cookie and a hard disk cookie according to a storage position at the client. The memory cookie may be maintained by a browser and stored in the memory, which may disappear when the browser is closed. In other words, an existence of a memory cookie may be temporary. The hard disk cookie, on the other hand, may be stored on a hard disk, for example, and may include an expiration period. The hard disk cookie may not be deleted unless the hard disk cookie is manually cleaned by a subscriber, or the hard disk cookie expires. Its existence is long term.

Based on the above principles of a cookie, a hard disk cookie may be employed and a cookie folder may be created in a ROM partition of a cell phone. The cookie folder may be used to store cookie information of all browsers. The cookie may be generated by correlating addresses of different websites with a registration name and password of a subscriber corresponding to the websites, as well as an IMEI number of the mobile terminal. The acronym IMEI is an abbreviation of International Mobile Equipment Identity, which may be a 15-digit "electronic string number", which may have a one-to-one correspondence to any given cell phone and may be unique throughout the world. Every cell phone may be assigned a globally unique IMEI number when the cell phone is assembled, and the IMEI number may be recorded by manufacturers from production to delivery. Therefore, cookies, generated based on an IMEI number, may have a property of unique confirmation. When a cell phone sends subscriber information via a browser to a website server, the cell phone may send correlated cookies to the website server at the same time, and the website server may store the IMEI number of the mobile terminal under a registration name corresponding to the subscriber.

When the subscriber uses any browser of the cell phone to log into a website, the cell phone may first search in a cookie folder to determine if a cookie of the website exists. If the cookie exists, the cookie may be sent to the server of the website. If the cookie does not exist, a cookie, corresponding to the website, may be generated in the cookie folder. When the server of the website receives the cookie correlated to an IMEI number of the cell phone, the server may read the IMEI number of the cell phone in the cookie, may search for the corresponding registration name according to the IMEI number of the cell phone, and may return, to the browser, a webpage when the registration name is used to log into the website, such that, for example, the subscriber does not need to input subscriber name and password.

A cookie may be generated by correlating addresses of different websites with a subscriber's registration name, password and a valid time corresponding to the websites, as well as an IMEI number of the mobile terminal. The cookie may be stored in a cookie folder. Since a cookie may include a certain period of validity, for example, three days, one month or one year, addition of a time property into the cookie may be generated through correlation to, for example, better meet a subscriber's need.

A server of a website may read an IMEI number of a mobile terminal in a cookie, may search for a corresponding registration name according to the IMEI number of the mobile terminal, and the server of the website may verify the cookie. If verification of the cookie fails, the subscriber may input a registration name and password again. If the verification of the cookie succeeds, the server may return, to the browser, a webpage when the registration name is used to log into the website. When the website receives a cookie sent from a mobile terminal, the website may verify the cookie, e.g. verify if a subscriber name corresponds to a password, verify if the cookie has expired, etc. If verification of the cookie fails, the subscriber name and password may be entered again, and a corresponding cookie may be generated through correlation. If the verification of the cookie succeeds, the webpage may be returned to the browser when the website is logged into.

Figure 2:
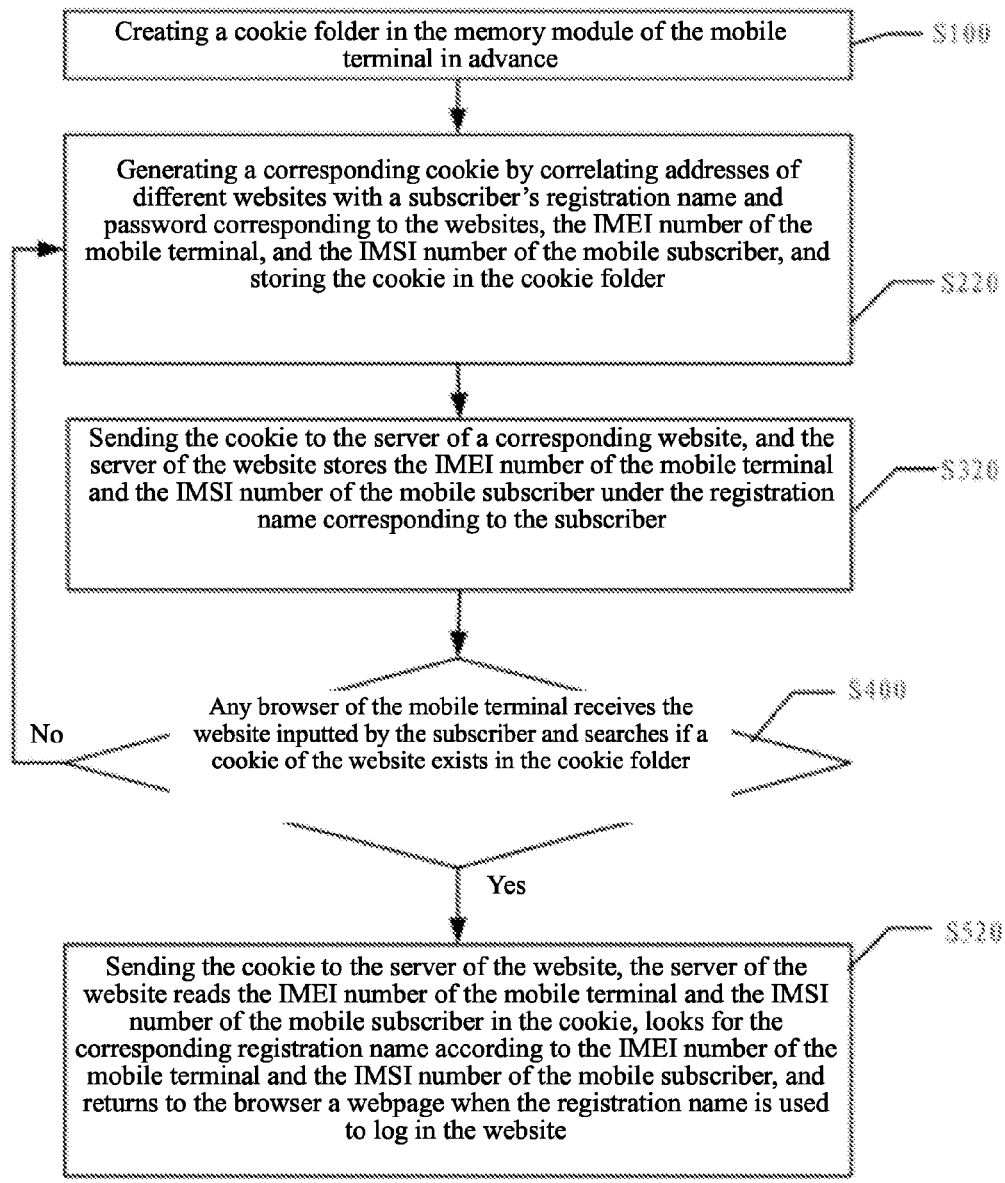
FIG. 2 depicts a structural block diagram of an exemplary method of trans-browser login for a mobile terminal according to the present invention.

Since a subscriber may use a mobile terminal, the mobile terminal may implement a method of trans-browser login such that the subscriber can log into any webpage that has been logged in through any browser with no need to type in the subscriber name and password again, even when the subscriber changes a SIM card. Turning to FIG. 2, to improve cookie security, a method of trans-browser login for a mobile terminal may correlate to an IMSI number of a SIM card to generate a cookie by creating a cookie folder in a memory module of the mobile terminal (block S100). The method may also include generating a corresponding cookie by correlating addresses of different websites with a registration name and password, of a subscriber, corresponding to the websites, an IMEI number of the mobile terminal, and an IMSI number of the mobile subscriber, and storing the cookie in the cookie folder (block S220). The method may further include sending the cookie to a server of a corresponding website, and the server of the website may store the IMEI number of the mobile terminal and the IMSI number of the mobile subscriber under a registration name corresponding to the subscriber (block S320). Any browser of the mobile terminal that receives the website, inputted by the subscriber, may search to determine if a cookie of the website exists in the cookie folder (block S400). If the cookie exists, the browser may send the cookie to the server of the website (block S400). The server of the website may read the IMEI number of the mobile terminal and the IMSI number of the mobile subscriber in the cookie, may search for the corresponding registration name according to the IMEI number of the mobile terminal and the IMSI number of the mobile subscriber, and may return, to the browser, a webpage when the registration name is used to log into the website (block 520). If the cookie does not exist, the a cookie may be generated and stored (block S400).

Thereby, the IMSI number of a SIM card may be used for correlation and generation of a cookie. Thereby, identity of a cell phone subscriber may be confirmed, and security of using a mobile terminal to log in a website may be improved. An International Mobile Subscriber Identification (IMSI) number may be used as a mark to differentiate mobile subscribers, may be stored in a SIM card, and may be used to differentiate valid information of mobile subscribers. A total length of an IMEI number may not exceed 15 digits, and may be 0~9 numbers. A hard disk cookie may be employed, and a cookie folder may be created in a ROM partition of a cell phone. The cookie folder may be used to store cookie information of all browsers. The cookie may be generated, for example, by correlating addresses of different websites with a subscriber's registration name and password corresponding to the websites, an IMEI number of the mobile terminal, and an IMSI number of the mobile subscriber. When a cell phone sends the subscriber information via a browser to a website server, the cell phone may send correlated cookies to the website server at the same time, and the website server may store the IMEI number of the mobile terminal and the IMSI number of the mobile subscriber under a registration name corresponding to the subscriber. When the subscriber uses any browser of the cell phone to log into a website, the cell phone may first search in a cookie folder to determine if a cookie of the website exists. If a cookie of the website exists, the cell phone sends the cookie to a server of the website. If the cookie does not exist, the cell phone may re-generate a cookie corresponding to the website in the cookie folder, and may re-correlate an address of the website with the subscriber's registration name and password corresponding to the website, an IMEI number of the mobile terminal, and an IMSI number of the mobile subscriber. When the server of the website receives the cookie correlated to the IMSI number and the IMEI number of the cell phone, the server may read the IMSI number and the IMEI number of the cell phone in the cookie, may search for a corresponding registration name according to the IMSI number and the IMEI number of the cell phone, and may return, to the browser, a webpage when the registration name is used to log into the website, such that the subscriber does not need to input a subscriber name and a password.

A cell phone may create a folder with a name of a cookie in a ROM partition of the cell phone, and cookie information of all browsers may be stored as sub-folders in the cookie folder. Subsequently, the cell phone may create a folder one, for example, in the cookie folder to store an IMSI number and an IMEI number of the cell phone. An IMEI number may be an International Mobile Equipment Identity, which may be used to identify cell phone equipment identity. An IMSI number, International Mobile Subscriber Identification Number, may also be used to identify a valid identity of a mobile subscriber. These two numbers may be used as a subscriber ID. When a subscriber opens up a browser (e.g., browser abc), a cookie may record information inputted by the subscriber into a login box on an associated website, and may create a folder login_abc in the folder one to store the recorded subscriber information. For example, the subscriber's registration name may be XX, an associated password may be 123456, a validity property may expire=Saturday, 1 Mar. 2014 00:00:01 GMT. At the same time the login_abc cookie is generated, the IMEI cell phone number and the IMEI subscriber number may be added as properties into a property of login_abc. Accordingly, the following corresponding database table may be developed, as shown in Table 1:

TABLE 1

| IMEI: 111111111111111 | Login_abc |
| IMSI: 222222222222222 | Website: www.soso.com |
| | Subscriber name: XX |
| | Password: 123456 |

In Table 1, the numbers of the IMEI cell phone number and the IMSI subscriber number are only examples, which are not limitations, and the Website is only an example website. When the cell phone sends the subscriber information via HTTPS, for example, to the website server, the cell phone may simultaneously send the IMEI cell phone number and the IMSI subscriber number, as a part of the subscriber information, to the server, and the server of the website may store the subscriber's IMSI number and IMEI cell phone number under the subscriber name. The information stored on the cell phone and the server, respectively, are listed in Table 2:

TABLE 2

| the information stored on the cell phone, i.e. the Cookie folder | the information stored on the server regarding the subscriber |
| --- | --- |
| IMEI: 111111111111111 | Subscriber name: XX |
| IMSI: 222222222222222 | Password: 123456 |
| Web list | IMEI: 111111111111111 |
| Website: www.soso.com | IMSI: 222222222222222 |

When the subscriber adds websites that have already been logged into, the web list in the cookie folder on the cell phone may increase, as shown in Table 3:

TABLE 3

| the information stored on the cell phone, i.e. the cookie folder |
| --- |
| IMEI: 111111111111111 |
| IMSI: 222222222222222 |
| Web list |
| www.soso.com |
| www.haha.com |

When the subscriber uses any browser of the cell phone to log into a website, the cell phone may first search in the Web list in the cookie folder to determine if the website has been logged into. If there is a record of the website, then the browser may send the corresponding IMEI and IMSI as the properties of the cookie to the server when the subscriber inputs the website. When the server receives the cookie information, it will extract the IMEI and IMSI information contained therein, may find the subscriber name in the database corresponding to the IMEI and the IMSI, may send the verification information through the browser, and may return a customized webpage, such as the webpage when the registration name is used to log into the website, to the browser.

Figure 3:
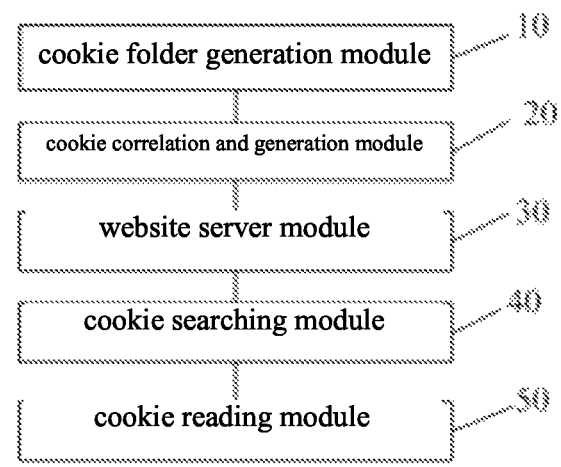
FIG. 3 depicts a structural block diagram of an exemplary device of trans-browser login for a mobile terminal according to the present invention.

With reference to FIG. 3, a device of trans-browser login for a mobile terminal may include a cookie folder generation module 10 for creating a cookie folder in a memory module of the mobile terminal. The device may also include a cookie correlation and generation module 20 for generating a corresponding cookie by correlating addresses of different websites with a subscriber's registration name and password corresponding to the websites, as well as the IMEI number of the mobile terminal. The device may further include a website server module 30 for receiving the cookie and storing the IMEI number of the mobile terminal under a registration name corresponding to the subscriber. The device may yet also include a cookie searching module 40 for searching to determine if a cookie of a website, inputted by the subscriber, exists in the cookie folder. The device may yet further include a cookie reading module 50 for reading the IMEI number of the mobile terminal in the cookie, searching for the corresponding registration name according to the IMEI number of the mobile terminal, and returning, to the browser, a webpage when the registration name is used to log into the website.

The cookie folder generation module 10 may create a cookie folder in a ROM of a cell phone, and cookie information of all browsers may be stored in the cookie folder. Subsequently, when the cell phone logs into a website, the cookie correlation and generation module 20 may generate a corresponding cookie by correlating addresses of different websites with the subscriber's registration name and password corresponding to the websites, as well as the IMEI number of the mobile terminal, and may stores the cookie in the cookie folder. At the same time, when the cell phone logs into the website, the website server module 30 may receive the cookie corresponding to the website, may read the IMEI number therein, and may store the IMEI number of the mobile terminal under the registration name corresponding to the subscriber. When the cookie folder is created and when the subscriber uses any browser of the cell phone to log into a website, the cookie searching module 40 in the cell phone may first search to determine if a cookie of the website, inputted by the subscriber, exists in the cookie folder. If the cookie exists in the cookie folder, the cookie searching module 40 may send the cookie to the server of the website. If the cookie does not exist, the registration name and password may be entered, and then the cookie correlation and generation module 20 may generate a cookie of the website through correlation. When the server of the website receives the cookie, the cookie reading module 50 may read the IMEI number of the cell phone in the cookie, may search for the corresponding registration name according to the IMEI number of the cell phone in the server, and may return, to the browser, a webpage when the registration name is used to log into the webpage, such that the subscriber can directly access the webpage when webpage is logged into.

The cookie correlation and generation module 20 may be further used for generating a corresponding cookie by correlating addresses of different websites with a subscriber's registration name and password corresponding to the websites, an IMEI number of the mobile terminal, and an IMSI number of the mobile subscriber.

The website server module 30 may be further used for receiving the cookie and storing the IMEI number of the mobile terminal and the IMSI number of the mobile subscriber under the registration name corresponding to the subscriber.

The cookie reading module 50 may be further used for reading the IMEI number of the mobile terminal and the IMSI number of the mobile subscriber in the cookie, searching for the corresponding registration name according to the IMEI number of the mobile terminal and the IMSI number of the mobile subscriber, and returning, to the browser, a webpage when the registration name is used to log into the website.

In summary, a method and device of trans-browser login for a mobile terminal may be provided. The method may first create a cookie folder in a memory module of the mobile terminal; may generate a corresponding cookie by correlating addresses of different websites with a subscriber's registration name and password corresponding to the websites, as well as a IMEI number of the mobile terminal, and may store the cookie in the cookie folder. The mobile terminal may send the cookie to a server of a corresponding website, and may store the IMEI number of the mobile terminal under a registration name corresponding to the subscriber in the server of the website. Any browser of the mobile terminal may receive the website, inputted by the subscriber, and may search to determine if a cookie of the website exists in the cookie folder. If the cookie exists, the mobile terminal may send the cookie to the server of the website. The server of the website may read the IMEI number of the mobile terminal in the cookie, may search for the corresponding registration name according to the IMEI number of the mobile terminal, and may return, to the browser, a webpage when the registration name is used to log in the website, such that the subscriber does not need to type in the registration name and password again when using any browser of the same mobile terminal to log in the same website, thereby resulting in great convenience for subscribers, and the login can be performed even when the subscriber changes the SIM card. If the cookie does not exist, the mobile terminal may generate a corresponding cookie through correlation. To improve the security of a subscriber's login to a website, an IMEI number of the cell phone and an IMSI number of the SIM card may be correlated to a registration name and password of the website to generate a cookie, such that the subscriber does not need to type in a registration name and password, even when the same cell phone and the same SIM card are not used to log into the website again, which may further improve security.

It should be understood that applications of the present invention are not limited to the above examples. To those skilled in the art, improvements or modifications may be made according to the above description, and all of these improvements or modifications shall be encompassed by the appended claims.

The invention claimed is:

1. A method of trans-browser login for a mobile terminal, the method comprising:
creating a cookie folder in a memory module of the mobile terminal;
generating a first cookie by correlating addresses of different websites with a registration name and password of a mobile subscriber corresponding to the different websites and an IMEI (International Mobile Equipment Identity) number of the mobile terminal;
storing the first cookie in the cookie folder;
sending the first cookie to a server of a first website, wherein the server of the first website stores the IMEI number of the mobile terminal under the registration name corresponding to the mobile subscriber;
receiving, at any browser of the mobile terminal, a second website inputted by the mobile subscriber;
searching if a second cookie of the second website, inputted by the mobile subscriber, exists in the cookie folder; and
if a second cookie of the second website, inputted by the mobile subscriber, exists in the cookie folder:
sending the second cookie of the second website, inputted by the mobile subscriber, to the server of the second website;
reading, by the server of the second website, the IMEI number of the mobile terminal in the second cookie;

searching for the registration name of the mobile subscriber according to the IMEI number of the mobile terminal; and returning, to the browser, a webpage when the registration name of the mobile subscriber is used to log in the second website;

if the second cookie of the second website, inputted by the mobile subscriber, does not exist in the cookie folder, generating a third cookie by correlating addresses of different websites with a registration name and password of the mobile subscriber corresponding to the different websites and the IMEI number of the mobile terminal;

wherein reading the IMEI number of the mobile terminal in the second cookie includes verifying, using the server of the second website, and the second cookie, if the verification of the second cookie fails, inputting the registration name and the password of the mobile subscriber; and if the verification of the second cookie succeeds, returning, to the browser, a webpage, when the registration name of the mobile subscriber is used to log in the website.

2. The method according to claim 1, wherein during verification of the second cookie, the server of the second website verifies if the mobile subscriber name corresponds to the password of the mobile subscriber or if the mobile subscriber name has expired.

3. The method according to claim 1, wherein generating a first cookie further comprises:

correlating addresses of different websites to an IMSI (International Mobile Subscriber Identity number) of the mobile subscriber and generating a corresponding first cookie, and storing the first cookie in the cookie folder.

4. The method according to claim 3, wherein sending the first cookie to the server of the first website further comprises:

the server of the first website storing the IMSI number of the mobile subscriber under the registration name corresponding to the mobile subscriber.

5. The method according to claim 4, wherein reading the IMEI number of the mobile terminal in the second cookie further comprises:

reading, by the server of the second website, the IMSI number of the mobile subscriber in the second cookie, searching for the corresponding registration name of the mobile subscriber according to the IMEI number of the mobile terminal and the IMSI number of the mobile subscriber, and returning, to the browser, a webpage when the registration name of the mobile subscriber is used to log into the second website.

6. A method of trans-browser login for a mobile terminal, the method comprising:

creating a cookie folder in a memory module of the mobile terminal;

generating a first cookie by correlating addresses of different websites with a registration name and password of a mobile subscriber corresponding to the different websites and an IMEI (International Mobile Equipment Identity) number of the mobile terminal;

storing the first cookie in the cookie folder;

correlating addresses of the different websites with a valid time of the mobile subscriber on said different websites and generating a corresponding second cookie, and storing the second cookie in the cookie folder;

sending the first cookie to a server of a first website, wherein the server of the first website stores the IMEI number of the mobile terminal under the registration name corresponding to the mobile subscriber;

receiving, at any browser of the mobile terminal, a second website inputted by the mobile subscriber;

searching if a third cookie of the second website, inputted by the mobile subscriber, exists in the cookie folder; and if the third cookie of the second website, inputted by the mobile subscriber, exists in the cookie folder:

sending the third cookie of the second website, inputted by the mobile subscriber, to the server of the second website;

reading, by the server of the second website, the IMEI number of the mobile terminal in the third cookie;

searching for the registration name of the mobile subscriber according to the IMEI number of the mobile terminal; and returning, to the browser, a webpage when the registration name of the mobile subscriber is used to log into the first website; and if the third cookie of the second website, inputted by the mobile subscriber, does not exist in the cookie folder, generating a fourth cookie by correlating addresses of different websites with a registration name and password of the mobile subscriber corresponding to the different websites and the IMEI number of the mobile terminal.

7. The method according to claim 6, wherein reading the IMEI number of the mobile terminal in the third cookie includes verifying, using the server of the second website, and the third cookie, if the verification of the third cookie fails, inputting the registration name and the password of the mobile subscriber; and if the verification of the third cookie succeeds, returning, to the browser, a webpage, when the registration name of the mobile subscriber is used to log into the website.

8. The method according to claim 7, characterized in that during verification of the third cookie, the server of the second website verifies if the mobile subscriber name corresponds to the password of the mobile subscriber or if the mobile subscriber name has expired.

9. The method according to claim 6, wherein generating a first cookie further comprises:

correlating addresses of different websites to an IMSI (International Mobile Subscriber Identity) number of the mobile subscriber and generating a corresponding fifth cookie, and storing the fifth cookie in the cookie folder.

10. The method according to claim 9, wherein sending the first cookie to the server of the first website further comprises:

the server of the first website storing the IMSI number of the mobile subscriber under the registration name corresponding to the mobile subscriber.

11. The method according to claim 10, wherein reading the IMEI number of the mobile terminal in the third cookie further comprises:

reading, by the server of the second website, the IMSI number of the mobile subscriber in the third cookie, searching for the corresponding registration name of the mobile subscriber according to the IMEI number of the mobile terminal and the IMSI number of the mobile subscriber, and returning, to the browser, a webpage when the registration name of the mobile subscriber is used to log into the second website.

12. A device of trans-browser login for a mobile terminal, the device comprising:
- a hardware memory module in a mobile terminal;
- a cookie folder generation module for creating a cookie folder in the memory module of the mobile terminal;
- a cookie correlation and generation module for generating a corresponding first cookie by correlating addresses of different websites with a registration name and password of a mobile subscriber corresponding to the different websites and an IMEI (International Mobile Equipment Identity) number of the mobile terminal;
- a website server module for receiving the first cookie and storing the IMEI number of the mobile terminal under the registration name corresponding to the mobile subscriber;
- a cookie searching module for searching if a second cookie of a website of the different websites, inputted by the mobile subscriber, exists in the cookie folder;
- a cookie reading module for reading the IMEI number of the mobile terminal in the second cookie, searching for the corresponding registration name of the mobile subscriber according to the IMEI number of the mobile terminal, and returning, to the browser, a webpage when the registration name of the mobile subscriber is used to log in the website;
- wherein the cookie folder generation module, cookie correlation and generation module, website server module, cookie searching module, and cookie reading module are all implemented by either software, hardware, or a combination of hardware and software.

13. The device according to claim 12, wherein said cookie correlation and generation module is further used for correlating to an IMSI (International Mobile Subscriber Identity) number of a mobile subscriber and generating a corresponding cookie.

14. The device according to claim 13, wherein said website server module is further used for receiving the first cookie and storing the IMSI number of the mobile subscriber under the registration name corresponding to the mobile subscriber.

15. The device according to claim 14, wherein said cookie reading module is further used for reading the IMSI number of the mobile subscriber in the second cookie, looking for the corresponding registration name of the mobile subscriber according to the IMEI number of the mobile terminal and the IMSI number of the mobile subscriber, and returning to the browser a webpage when the registration name of the mobile subscriber is used to log in the website.

16. The device according to claim 12, wherein the cookie correlation and generation module is further for correlating addresses of the different websites with the valid time of the mobile subscriber on said different websites and generating a corresponding third cookie, and storing the third cookie in the cookie folder.

17. The device according to claim 12, wherein if a cookie of the website, inputted by the mobile subscriber, does not exist in the cookie folder, a cookie is generated by correlating addresses of different websites with a registration name and password of a mobile subscriber corresponding to the different websites and an IMEI number of the mobile terminal.

18. The device according to claim 12, wherein the second cookie is verified, and wherein if the verification of the second cookie fails, inputting the registration name and the password of the mobile subscriber.

19. The device according to claim 12, wherein if the verification of the second cookie succeeds, a webpage is returned to the browser when the registration name of the mobile subscriber is used to log into the website.

* * * * *